May 12, 1959  J. HUFF  2,885,718
FRAME STRUCTURE FOR CASTER PINTLE
Filed June 17, 1957
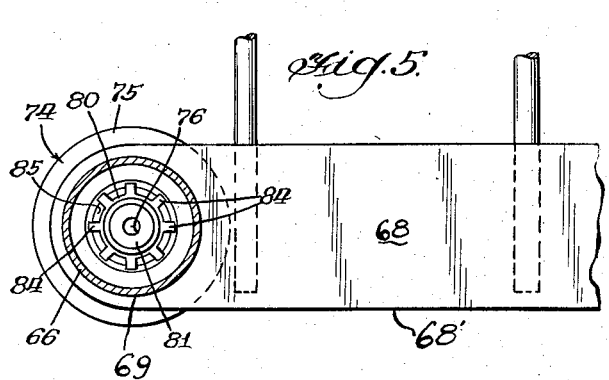
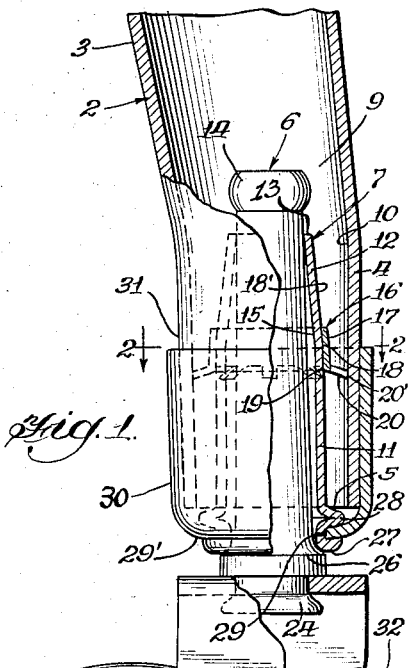
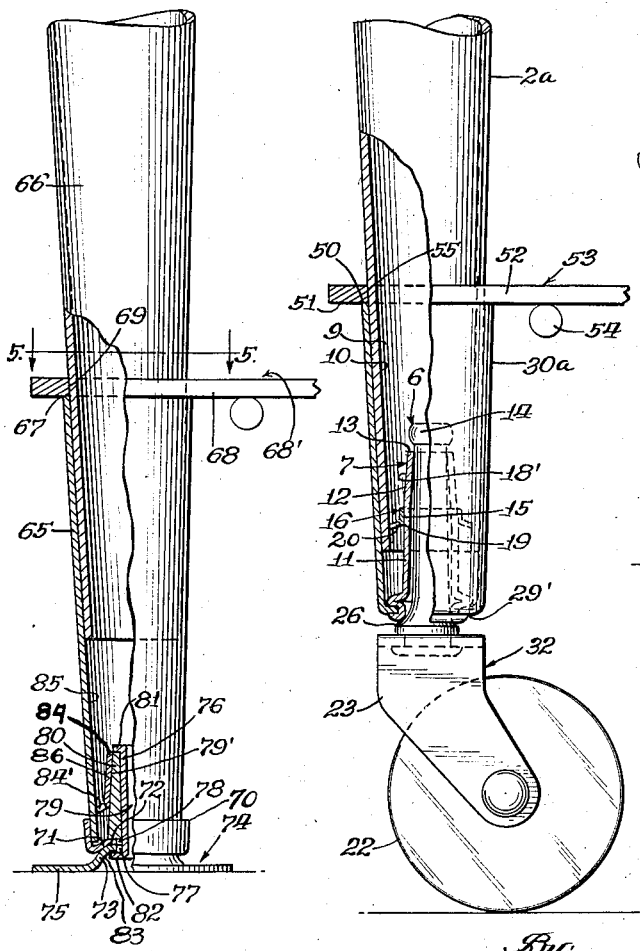
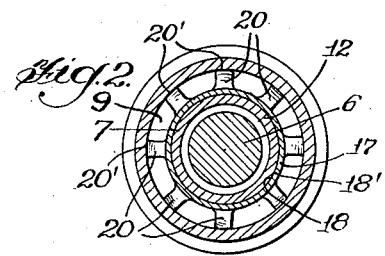
Inventor:
John Huff
By John J. Kowalik, Atty.

United States Patent Office 2,885,718
Patented May 12, 1959

2,885,718

FRAME STRUCTURE FOR CASTER PINTLE

John Huff, Chicago, Ill.

Application June 17, 1957, Serial No. 666,014

2 Claims. (Cl. 16—39)

This invention relates to pivotal supports for table legs and more specifically to such supports which also function to carry other parts such as shelves.

A general object of the invention is to provide a novel mounting for a caster wheel or glider from a conical leg.

A further object of the invention is to provide in several embodiments of the invention a novel mounting for a caster wheel which includes a simple, effective and inexpensive resilient retainer for holding the caster wheel spindle yieldably confined within a hollow conical leg and at the same time prevent the spindle from canting out of vertical and which permits easy assembly and dismantling of the parts.

A still further object in several of the embodiments is to provide a novel mounting for the pivot leg supports which in addition to anchoring the supports to the legs also serve to fasten and carry shelving on the legs.

These and other objects of the invention will become more apparent from the specification and the drawings, wherein:

Figure 1 is a fragmentary side elevational view partially in vertical section of one form of leg support mounting;

Figure 2 is a cross-sectional view taken substantially on line 2—2 of Figure 1;

Figure 3 is a fragmentary side elevational view partly in section of another embodiment;

Figure 4 is a fragmentary side elevational view partially in vertical section of still another form of the invention; and, Figure 5 is a transverse generally horizontal sectional view of the structure shown in Figure 4 taken substantially on line 5—5 of Figure 4.

Describing the invention in detail and having particular reference to the embodiment of Figures 1 and 2, there is illustrated a hollow conical leg 2 which has a diagonal upper portion 3 attachable to a table top and a vertical lower end portion 4. The lower end portion 4 has an open bottom 5.

A caster spindle 6 and a spindle holder 7 in which the spindle is mounted extend upwardly into the base or hollow 9 of the leg in coaxial relation thereto and spaced equidistantly from the inner periphery 10 of the leg.

The holder 7 has a generally cylindrical lower portion 11 and a conical upper portion 12 which about its upper edge 13 closely surrounds the cylindrical spindle or shank 6 which extends upwardly of edge 13 and at its upper end has an enlarged head 14 which prevents downward withdrawal of the spindle.

The upper portion 13 has sleeved thereon adjacent to the base part 15 thereof a combination centering and shock absorber device or retainer generally designated 16. This device comprises an annular member including a conical sleeve portion 17 which has an inner surface 18 fitting complementally over the exterior 18' of the upper portion 12 of the holder 7 thus obtaining a locking fit therewith. The lower margin 19 of the sleeve 17 is provided with a plurality of outwardly and downwardly uniformly circumferentially spaced fingers, tines, or teeth 20 which are longer than the radial distance between the sleeve and the internal surface 10 of the leg. The device thus resists upward movement into the leg and precludes withdrawal through the bottom and at the same time, being of steel, preferably spring steel, it tends to center the holder 7 and the spindle 6 therewithin and yieldably resists lateral or radial deflection of the spindle and holder thus holding the spindle vertical but accommodating slight lateral yield when the caster wheel 22 mounted in the fork 23 upon the lower end 24 of the spindle strikes an obstruction when wheeled. The lower end of the spindle has a shoulder 26 which rides against the bottom of a lower or external outturned flange 27 of the holder 6, the holder having an internal flange 28 by means of which the holder is staked or clinched through an opening 29 to a bottom wall 29' of the conical ferrule 30 which sleeves over the external conical surface 31 of the lower portion of the leg.

In assembling the caster wheel unit 32 with the leg, the retainer 16 is sleeved over portion 12 with the tines at its lower end. The retainer 16 is then inserted with the spindle and holder into the lower end of the leg and forced upwardly until the ferrule is completely entered over the lower end of the leg. As this action takes place, the tines are angled downwardly until the unit 16 clears the restricted periphery of the bottom opening of the leg by downward deflection of the fingers and enters into the interior. The upward or inward movement of the spindle and holder tightly jams the sleeve portion 17 onto the portion 12 of the holder and at the same time the sharp outer ends 20' of the teeth 20 bite into the interior of the leg. Thus the holder is tightly secured in the leg but is removable from the sleeve portion 17. The unit 16 may be removed from the leg either by forcing it upwardly into the widening part of the leg or by bending the teeth in a suitable tool to clear the interior of the leg.

Referring now to Figure 3, parts identical with those of the previously described embodiment are identified with the same reference characters. It will be noted that the ferrule 30a corresponds to ferrule 30 of Figures 1 and 2 but has been extended lengthwise and at its upper edge 50 provides a seat for the bottom side 51 of a side rail 52 of a shelf 53 which includes cross members 54. It will be understood that there is a strap or rail 52 at each side of the tray and that the members 54 extend therebetween and are connected thereto. The side rail has an opening 55 at each end sleeved over the conical leg and the diameter of the opening is such that it obtains a locking fit with an intermediate portion of the conical leg 2a which generally corresponds to leg 2 but is essentially straight. Thus the ferrule 30a locks the side rail to the leg and the retainer 16 functions additionally in this embodiment as a locking device as well as a yieldable centering unit.

In Figures 4 and 5 there is shown a further embodiment which includes a conical leg extension 65 which complementally sleeves over the lower end of conical leg 66 and has an upper edge 67 which affords a seat for the rail 68 of the shelf 68', the rail having an opening 69 which admits the leg 66 therein and wedges with an intermediate part thereof.

A ferrule 70 sleeves over the lower end of extension or leg portion 65 and has a bottom wall 71 with an upwardly convexed portion providing a downwardly facing concave socket 72 into which fits the ball or convex medial portion 73 of a glider 74 which has a bearing flange 75 about the central ball portion 73 for seating upon the ground. Portions 72 and 73 are loosely riveted together by the rivet 76 through holes 77 and 78 in the mating parts 73, 71, respectively. The rivet 76 has a shank portion 79 about which is sleeved a conical holder 80 abutting against the upper rivet head 81 which has a lower head 82 abutting against the underside 83 of the ball portion 73. The holder or sleeve 80 rockably seats at its lower end on the top side or the upper convexed surface of the socket part 72.

A retainer 84 has a conical portion 86 which complementally sleeves over the exterior conical surface 79' of the wedge sleeve 80 and has about its lower edge outstanding tines, fingers or teeth 84' which are downwardly and outwardly inclined and are sharp cornered as in the other embodiments about their outer extremities and bite into the interior periphery 85 of the sleeve or leg extension or portion 65.

Thus in each instance there is provided a novel means for locking the leg support to the leg for yieldably centering the pintle, that is it serves to hold the center post vertically and in Figures 3–5 also exerts an inward or upward pull to lock the ferrule to the leg.

It will be understood that the foregoing specification is intended to describe several exemplary forms of the invention only in explanation and not in limitation and that other forms of the invention will be readily apparent within the scope of the appended claims.

I claim:

1. The combination of a hollow downwardly tapered leg having an internal conical periphery and terminating in a lower end portion with an open bottom, a ferrule having a sleeve portion telescoped over said lower end portion of the leg and having an upper seating edge and having a bottom wall closing said open bottom of the leg, said sleeve portion and lower end portion of the leg having complementary wedging engagement with each other, a pintle holder connected to said bottom wall and extending into said leg in radially spaced relation thereto, said holder having an upwardly tapered external surface, a centering and locking element having a sleeve telescoped over said holder and having an internal upwardly tapered surface in wedge engagement with said external upwardly tapered surface on said holder, a plurality of fingers extending outwardly and sloping downwardly from said sleeve of said element and yieldably and tightly engaging the internal conical periphery of the leg, and a shelf supporting member having a conical aperture sleeved over the leg and in wedge engagement therewith and seated upon said upper edge of said sleeve portion.

2. The combination according to claim 1 and said pintle holder and said centering and locking element being readily separable by withdrawing the ferrule from the leg and the holder therewith from said element while said element remains within the leg.

References Cited in the file of this patent

UNITED STATES PATENTS

| 966,788 | Bent | Aug. 9, 1910 |
| 1,136,201 | Adams | Apr. 20, 1915 |
| 1,159,839 | Harrison | Nov. 9, 1915 |

FOREIGN PATENTS

| 3,431 | Great Britain | Mar. 13, 1897 |